(12) United States Patent
Parks et al.

(10) Patent No.: US 7,753,183 B2
(45) Date of Patent: Jul. 13, 2010

(54) OUTER PLATE WITH ARC SPRING DRIVE TAB FOR A TORQUE CONVERTER DAMPER

(75) Inventors: Kevin Parks, Wooster, OH (US); Craig Kneidel, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 497 days.

(21) Appl. No.: 11/788,138

(22) Filed: Apr. 19, 2007

(65) Prior Publication Data

US 2008/0173509 A1 Jul. 24, 2008

Related U.S. Application Data

(60) Provisional application No. 60/796,430, filed on May 1, 2006.

(51) Int. Cl.
*F16H 45/02* (2006.01)

(52) U.S. Cl. ............... 192/3.29; 192/70.17; 192/70.18; 192/212; 192/107 M; 192/70.14; 248/634

(58) Field of Classification Search ................. None
See application file for complete search history.

(56) References Cited

U.S. PATENT DOCUMENTS

| 5,209,330 | A | 5/1993 | Macdonald | |
|---|---|---|---|---|
| 5,947,243 | A | 9/1999 | MacDonald | |
| 5,964,328 | A | 10/1999 | Fallu et al. | |
| 6,006,878 | A | 12/1999 | Macdonald et al. | |
| 6,053,292 | A | 4/2000 | Macdonald | |
| 6,293,380 | B1 * | 9/2001 | Arhab | 192/3.29 |
| 6,508,346 | B1 | 1/2003 | Simpson | |
| 6,547,051 | B2 * | 4/2003 | Yoshimoto et al. | 192/3.29 |
| 6,837,347 | B2 | 1/2005 | Tomiyama | |
| 6,866,129 | B2 | 3/2005 | Tomiyama | |
| 6,871,733 | B2 | 3/2005 | Cannon et al. | |
| 7,201,261 | B2 * | 4/2007 | Zuehl | 192/3.29 |
| 2004/0060793 | A1 * | 4/2004 | Dacho et al. | 192/3.29 |
| 2004/0226794 | A1 * | 11/2004 | Sasse et al. | 192/3.29 |

FOREIGN PATENT DOCUMENTS

JP 2005-265021 9/2005

* cited by examiner

*Primary Examiner*—David D Le
*Assistant Examiner*—Ryan Dodd
(74) *Attorney, Agent, or Firm*—Simpson & Simpson, PLLC (57) ABSTRACT

A torque converter with a casing, a turbine, and a piston having a first friction surface located at a radially outer portion of the piston, and a first drive ring having second and third friction surfaces. The piston is displaceable to engage the first and second friction surfaces. The torque converter also includes a second drive ring having fourth and fifth friction surfaces. The first drive ring is displaceable to engage the third and fourth friction surfaces. The second drive ring is driveably connected to the piston and to an elastic member of a damper. The torque converter includes a sixth friction surface for the casing. The second drive ring is displaceable to engage the fifth and sixth friction surfaces, the first drive ring and the casing are nonreleasably connected, and the first drive ring is axially displaceable with respect to the casing.

15 Claims, 11 Drawing Sheets

PRIOR ART

FIG. 1

PRIOR ART

PRIOR ART

PRIOR ART

OUTER PLATE WITH ARC SPRING DRIVE TAB FOR A TORQUE CONVERTER DAMPER

CROSS-REFERENCE TO RELATED APPLICATIONS

This application claims the benefit under 35 U.S.C. §119 (e) of U.S. Provisional Application No. 60/796,430 filed May 1, 2006.

FIELD OF THE INVENTION

The invention relates generally to torque converters, more specifically to a damper for a torque converter and, more specifically, to an outer plate with an arc spring drive tab for a torque converter damper.

BACKGROUND OF THE INVENTION

Figure 1:
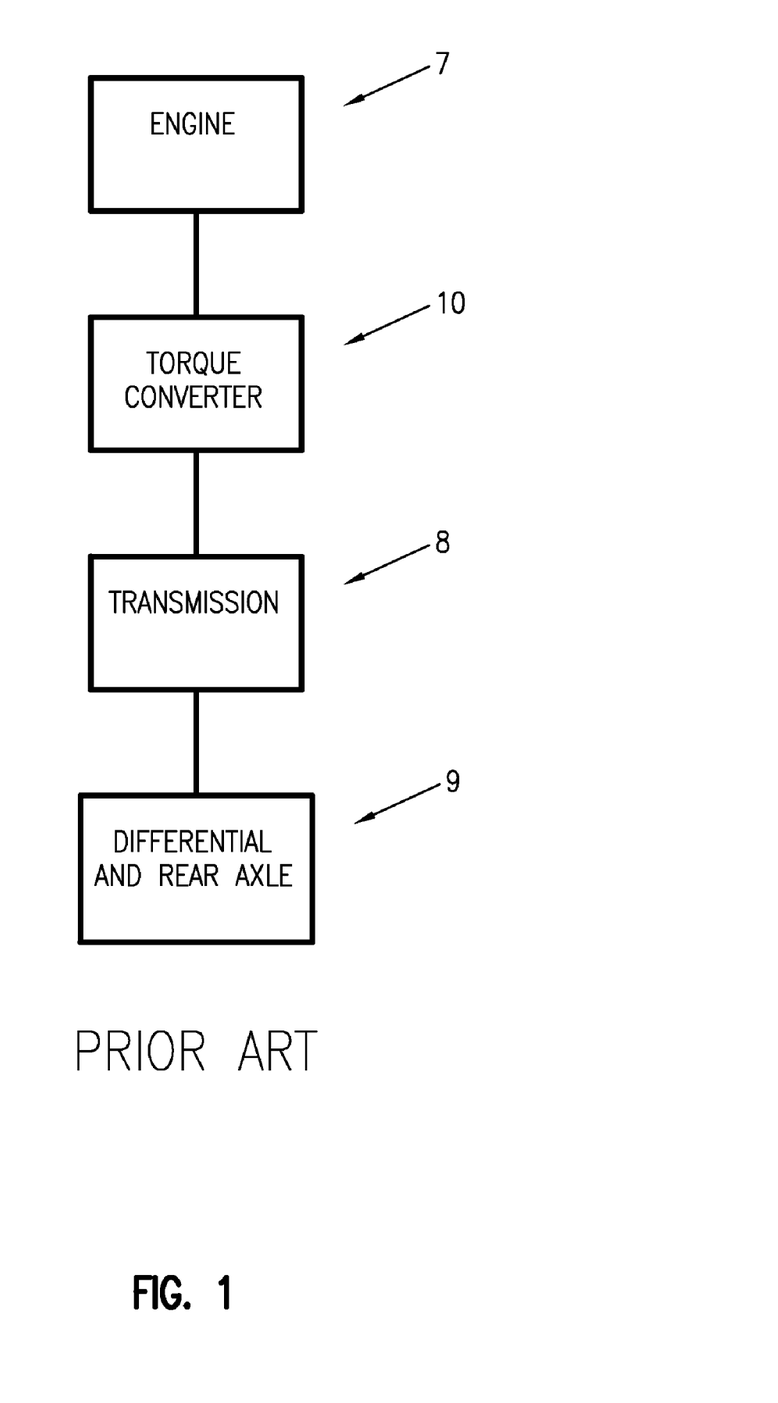
FIG. 1 is a general block diagram illustrating power flow in a motor vehicle, intended to help explain the relationship and function of a torque converter in the drive train thereof.

It is well known that a torque converter is used to transmit torque from an engine to a transmission of a motor vehicle. FIG. 1 illustrates a general block diagram showing the relationship of the engine 7, torque converter 10, transmission 8, and differential/axle assembly 9 in a typical vehicle.

Figure 2:
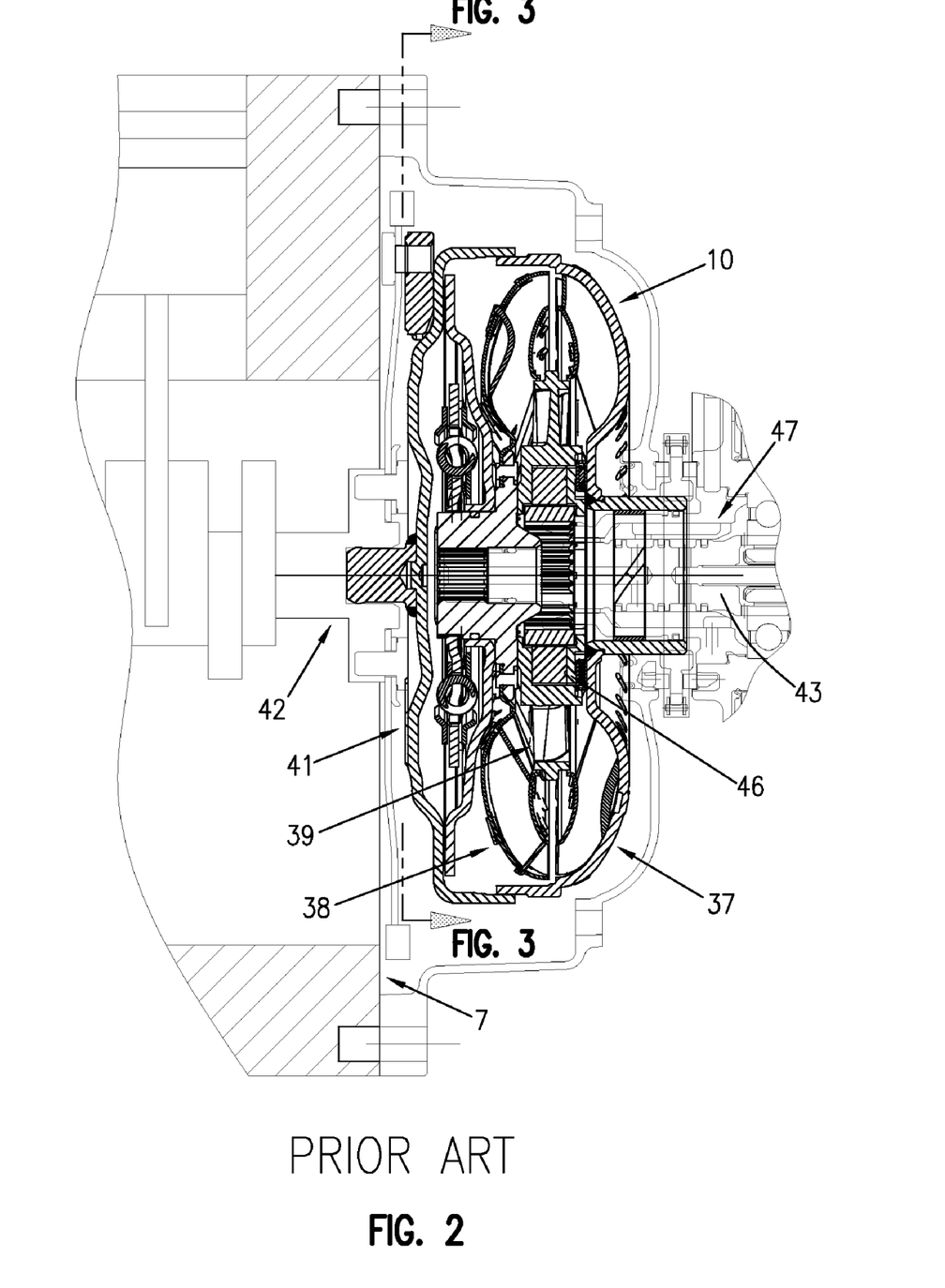
FIG. 2 is a cross-sectional view of a prior art torque converter, shown secured to an engine of a motor vehicle.
Figure 3:
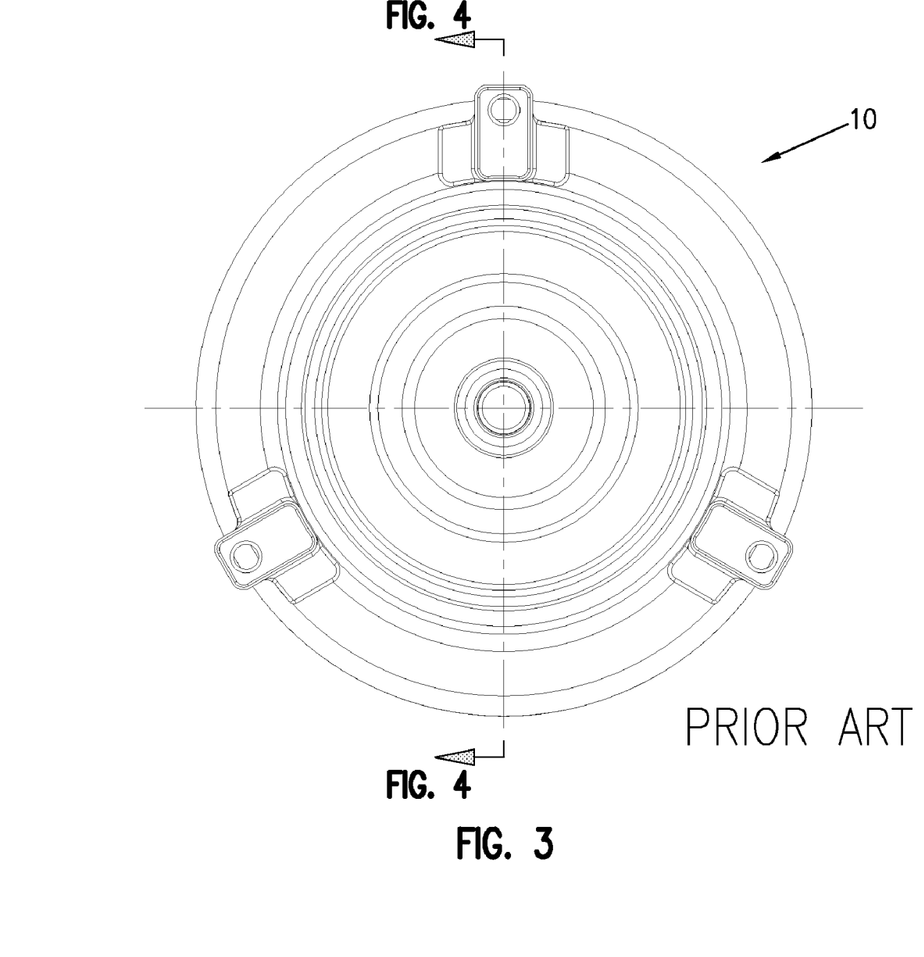
FIG. 3 is a left view of the torque converter shown in FIG. 2, taken generally along line 3-3 in FIG. 2.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Known multiple plate designs use a tab from the piston plate to driveably connect to an elastic member of a damper. A tab is formed at the outer diameter of the piston plate to transfer engine torque fluctuations from the piston plate to the damper springs. Drive ring tabs engage piston plate tabs or slots, transferring additional torque through the piston drive tabs into the springs. Torque from engine firings can be as high as 4× higher than rated engine torque in some diesel applications.

High torque fluctuations cause the piston plate and springs to wear. Wear is caused by a small contact area between the piston tab and the spring, and high impact forces from engine torque fluctuations. Sometimes, endcaps are placed on the springs to provide additional contact area with the piston plate tabs. In extreme situations, however, piston plate tabs wear significantly from contact with the springs or endcaps. The springs and endcaps generally wear much less than the piston plate tabs.

There is an inherent problem with the interface between the piston plate tabs and the springs or endcaps. Springs and endcaps are very hard. Spring wire is a high strength wire with a very hard surface for durability. Endcaps are hardened to match spring hardness. Piston plate tabs are relatively soft, compared with the springs and endcaps. The material used for the piston plate must be ductile so that it can be formed without cracking. This material is not easily hardened, and a surface hardness would likely crack when the piston plate is deflected during lockup.

Thus, there is a long-felt need for a multiple plate torque converter clutch with improved durability. In particular, there is a long-felt need for a drive plate with an arc spring drive tab for a torque converter damper.

BRIEF SUMMARY OF THE INVENTION

The present invention broadly comprises a hydrokinetic torque converter that includes a casing, an impeller driveably connected to the casing and a turbine located between the casing and the impeller, a clutch for driveably releasing and locking the impeller and turbine, including: a turbine hub connected to the turbine; a piston slidably mounted on the turbine hub, sealed on said turbine hub against passage of fluid, and having a first friction surface located at a radially outer portion of the piston. The torque converter also includes a first drive ring having second and third friction surfaces. The piston is displaceable to engage the first and second friction surfaces. The torque converter further includes a second drive ring having fourth and fifth friction surfaces. The first drive ring is displaceable to engage the third and fourth friction surfaces. The second drive ring is driveably connected to the piston and to an elastic member of a damper. The torque converter includes a sixth friction surface for the casing. The second drive ring is displaceable to engage the fifth and sixth friction surfaces, the first drive ring and the casing are non-releasably connected, and the first drive ring is axially displaceable with respect to the casing.

It is a general object of the present invention to provide an outer plate with an arc spring drive tab for a torque converter damper.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7:
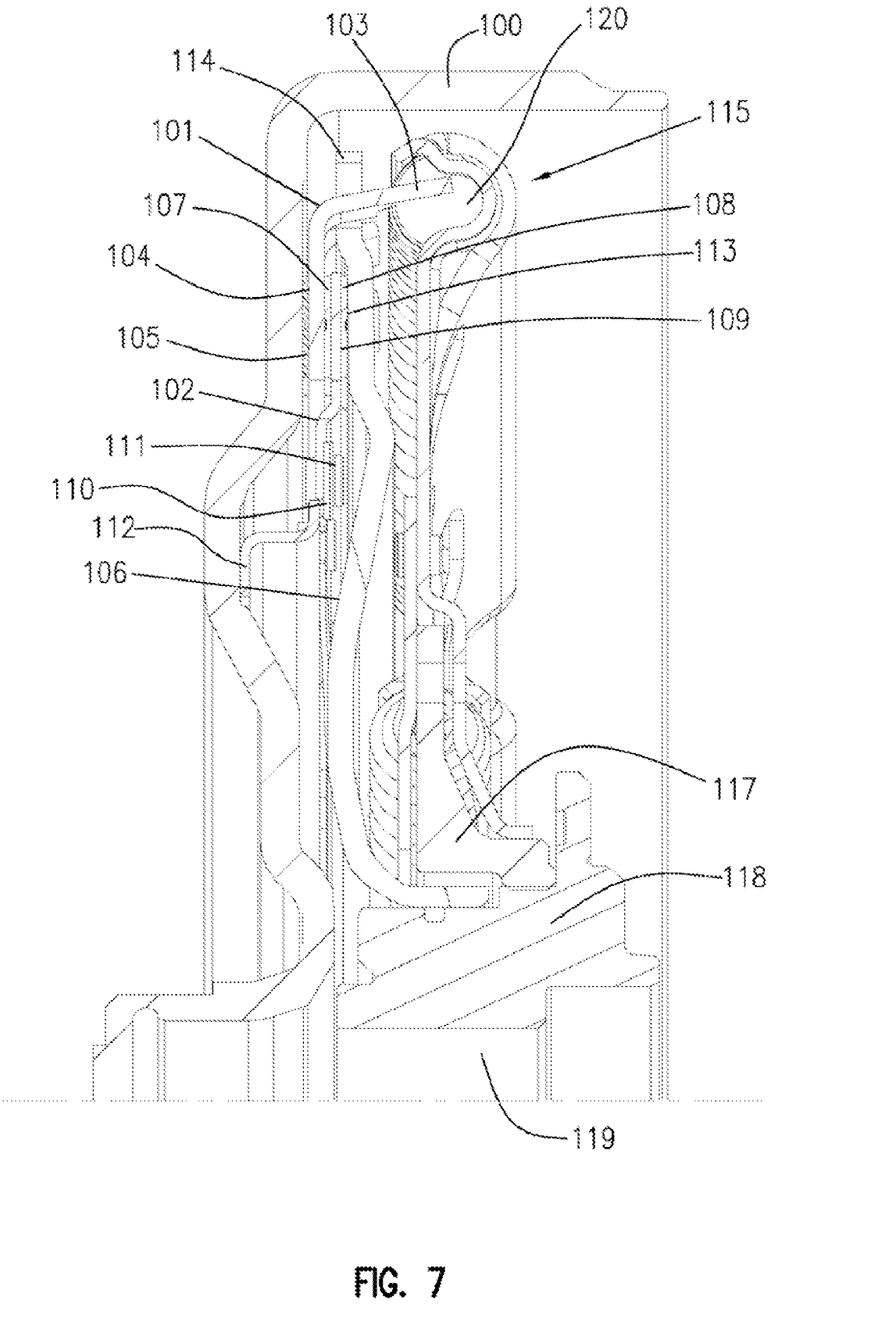
FIG. 7 is a cross-sectional view of the torque converter clutch and cover assembly of the present invention.
Figure 8:
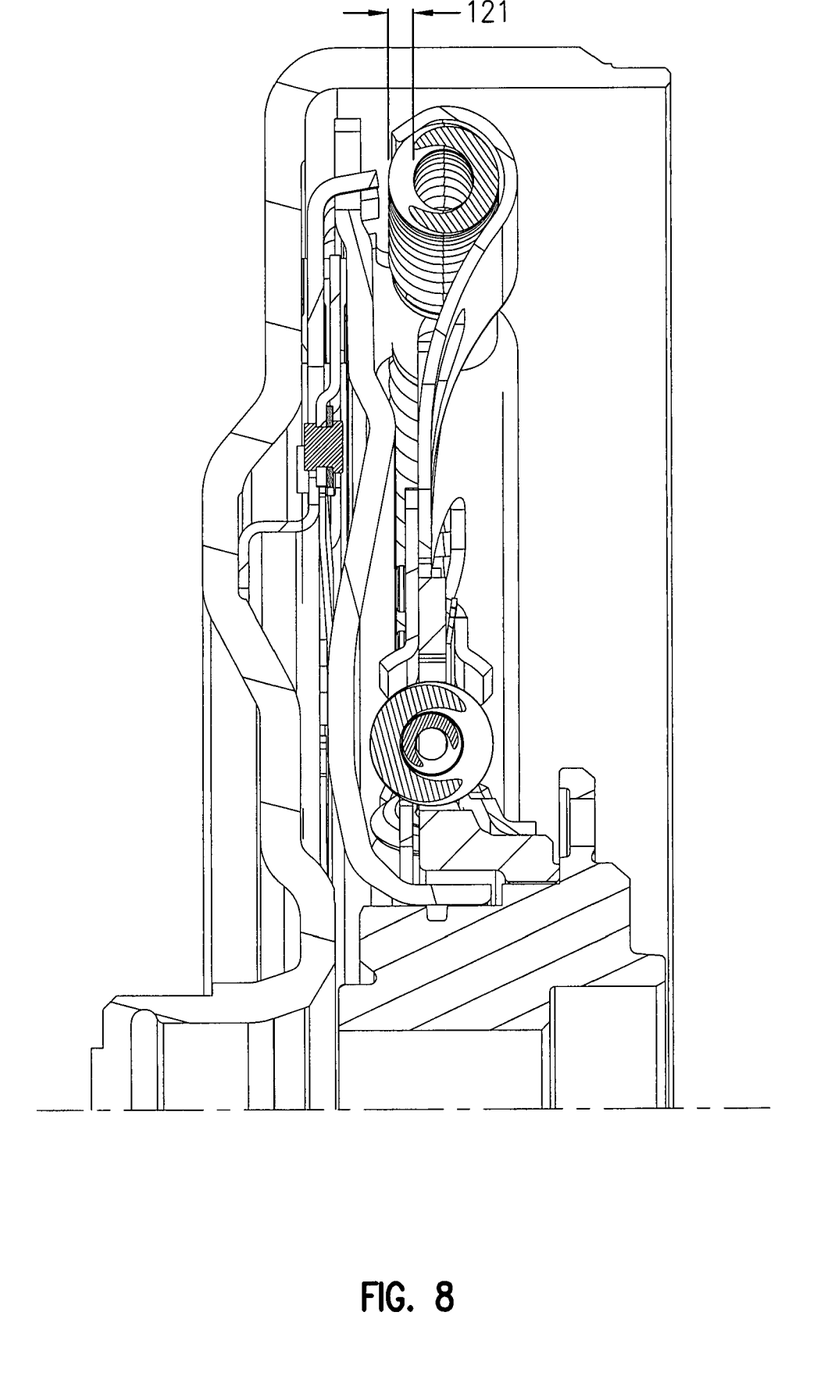
FIG. 8 is a second cross-sectional view of the torque converter clutch and cover assembly of the present invention.

FIG. 7 is a cross-section of a present invention torque converter clutch and cover assembly. FIG. 8 is a second cross-section of a present invention torque converter clutch and cover assembly. The following description should be viewed in light of FIGS. 7 and 8.

Cover 100 is arranged to receive torque from engine crankshaft (not shown). Drive plate 101 is positioned between cover 100 and drive ring 102. Drive plate 101 comprises spring engagement portion 103 and friction face portion 104. Friction material 105 is bonded to friction face portion 104 of drive plate 101 using any means known in the art. For instance, friction material 105 may be bonded to friction face portion 104 of drive plate 101 using adhesive.

Figure 9:
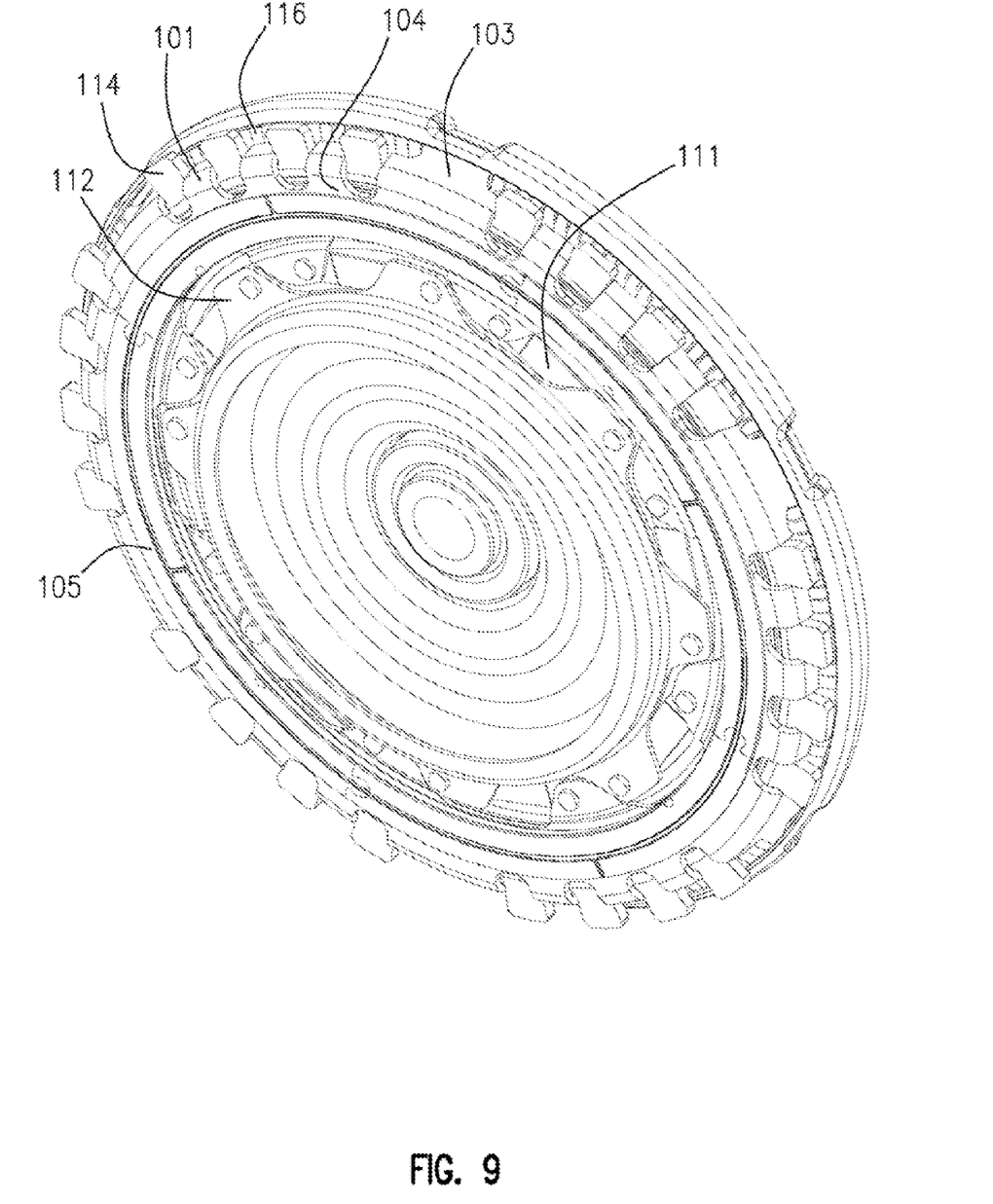
FIG. 9 is a front perspective view of the torque converter clutch assembly of the present invention.
Figure 10:
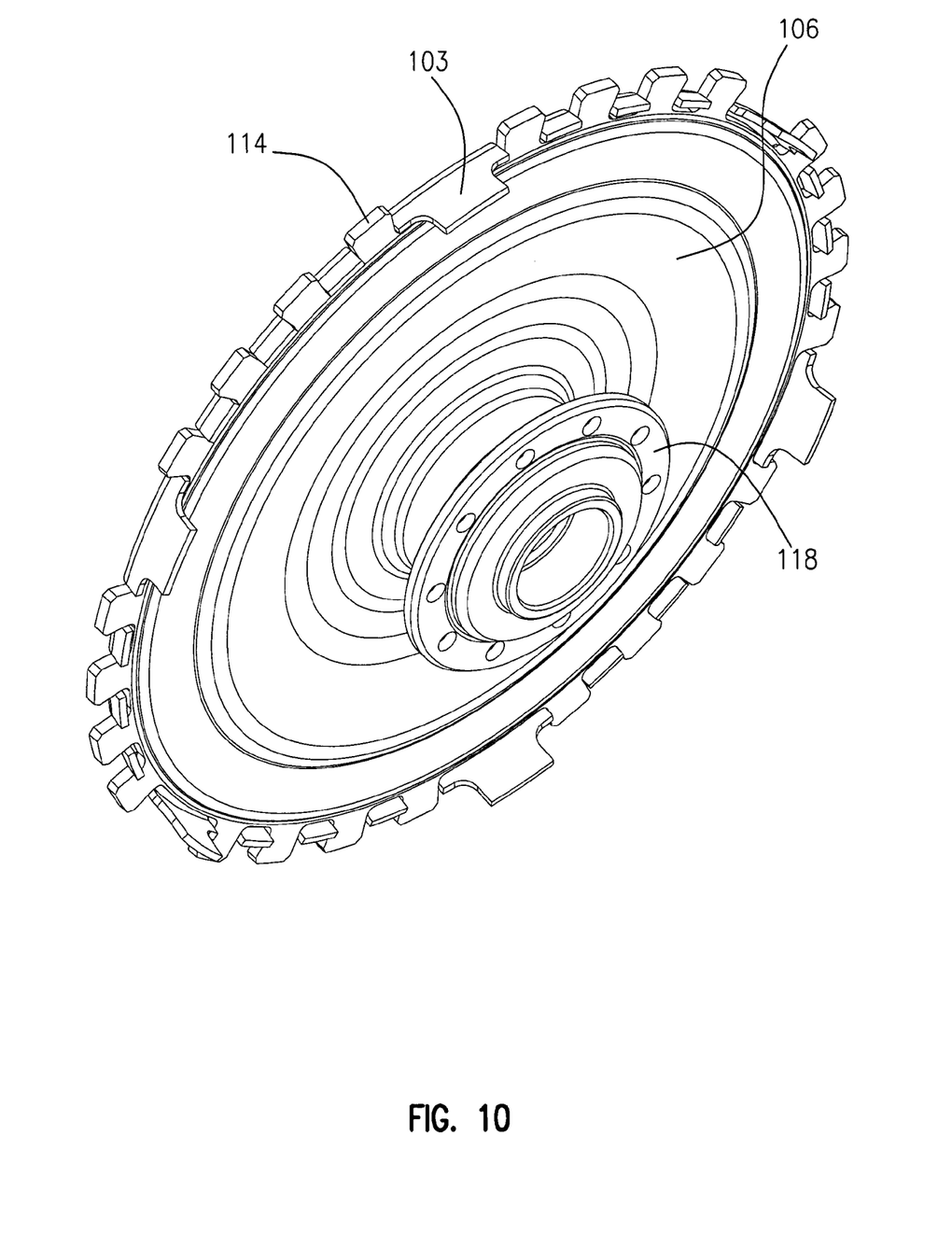
FIG. 10 is a rear perspective view of the torque converter clutch assembly shown in FIG. 9.

FIG. 9 is a front perspective view of a present invention torque converter clutch assembly. FIG. 10 is a back perspective view of a present invention torque converter clutch assembly. The following should be viewed in light of FIGS. 7-10.

Drive ring 102 is arranged to transmit torque from cover 100 to drive plate 101 and piston plate 106 through friction material rings 107 and 108. Drive ring 102 comprises friction face portion 109 and cover connection portion 110. Leaf spring 111 transmits torque from cover connector ring 112 to cover connection portion 110 of drive ring 102. Leaf spring 111 is attached to cover connector ring 112 and cover drive ring 102 by any means known in the art. For instance, leaf spring 111 may be attached to cover connector ring 112 and cover drive ring 102 by riveting. Cover connector ring 112 is attached to cover 100 using any means known in the art. For instance, cover connector ring 112 may be attached to cover 100 by welding.

Piston plate 106 is arranged to transmit torque from drive ring 102 to drive plate 101. Piston plate 106 comprises friction face portion 113 and drive tab portion 114. When piston plate 106 is pressurized, torque from drive ring friction material ring 108 is transferred to piston plate friction face portion 113. Torque received from drive ring 102 is transferred to drive plate 101 through drive tabs 114. Drive tabs 114 are arranged to engage spring engagement portion 103 of drive plate 101.

Damper assembly 115 comprises elastic members 116. Elastic members 116 may be any damping means known in the art. For instance, elastic members 116 may be compression springs. Furthermore, elastic members 116 may be arc shaped compression springs. Damper assembly 115 further comprises flange 117. Damper assembly 115 is arranged to transmit torque from drive plate 101 to turbine hub 118 through flange 117. Turbine hub 118 transmits torque to transmission input shaft (not shown) through spline portion 119.

When torque converter 10 is operating in torque converter mode, torque is transmitted to turbine hub 118 as described supra. Torque converter clutch mode is activated by applying hydraulic pressure to piston plate 106. Pressure acting on piston plate 106 urges piston plate friction face portion 113 into contact with drive ring friction material ring 108. Force is transferred from friction material ring 108 through friction face portion 109 to friction material ring 107. Similarly, force is transferred to drive plate friction face portion 104, friction material 105 and finally to cover 100. Because cover 100 and drive ring 102 receive engine torque, three contact surfaces transmit engine torque to the torque converter clutch assembly. Therefore, this configuration may be referred to as a triple plate design.

Engine torque transmitted by cover 100 and drive ring 102 is received by drive plate 101 and piston plate 106 in the following manner. Friction created by pressure force on piston plate 106 clamps piston plate 106, drive ring 102, drive ring 101 and cover 100 together. Torque is transmitted by friction material rings 105, 107, and 108. Torque received by piston plate friction face portion 113 is transmitted to drive plate 101 through piston plate drive tab portion 114. Piston plate drive tab portions 114 comprise radial extensions from piston plate friction face portion 113. Drive tabs 114 are arranged to interface with spring engagement portions 103 of drive plate 101. Spring engagement portions 103 comprise tabs extending in a substantially axial direction to engage piston plate drive tabs 114 and damper elastic members 116. In some aspects, drive plate 101 comprises additional tabs extending axially to engage piston plate drive tab portions.

Piston 106 includes first friction surface 113 located at a radially outer portion of the piston. Drive ring 102 has second and third friction surfaces facing rings 108 and 107, respectively. The piston is displaceable to engage the first and second friction surfaces. Drive ring 104 has fourth and fifth friction surfaces facing ring 107 and material 105, respectively. Drive ring 102 is displaceable to engage the third and fourth friction surfaces. The torque converter includes a sixth friction surface for the casing formed by material 105. Drive ring 104 is displaceable to engage the fifth and sixth friction surfaces.

Figure 11:
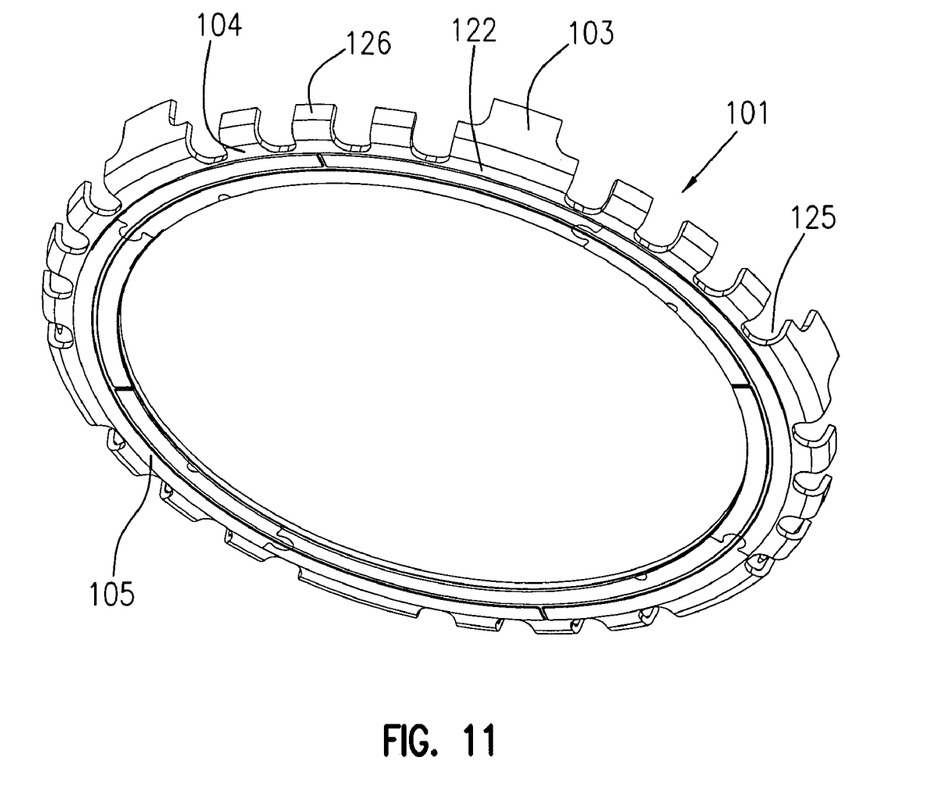
FIG. 11 is a front perspective view of the drive plate of the present invention.
Figure 12:
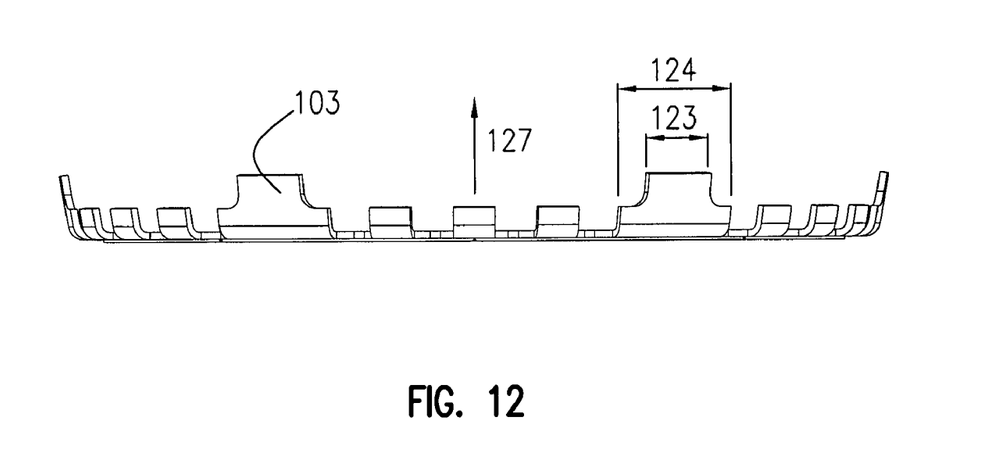
FIG. 12 is a top view of the drive plate shown in FIG. 11.

FIG. 11 is a front perspective view of a present invention drive plate. FIG. 12 is a top view of the drive plate shown in FIG. 11. The following should be viewed in light of FIGS. 11 and 12. Drive plate 101 comprises spring engagement portion 103 and ring attachment portion 122. In some aspects, ring attachment portion 122 is wider than spring engagement portion. That is, width 123 is larger than width 124. Additional width at ring attachment portion 122 improves durability by limiting stress in bend 125. Reduced width of spring engagement portion 123 allows longer elastic members, thereby increasing damper energy storage capacity.

In some aspects, drive plate 101 further comprises piston plate engagement tabs 126. Tabs 126 extend in axial direction 127 and are positioned to engage piston plate tabs 114. Drive tabs 126 reduce pressure and unit loading on piston plate tabs 114, thereby reducing wear on piston tabs 114 and drive tabs 126.

Figure 4:
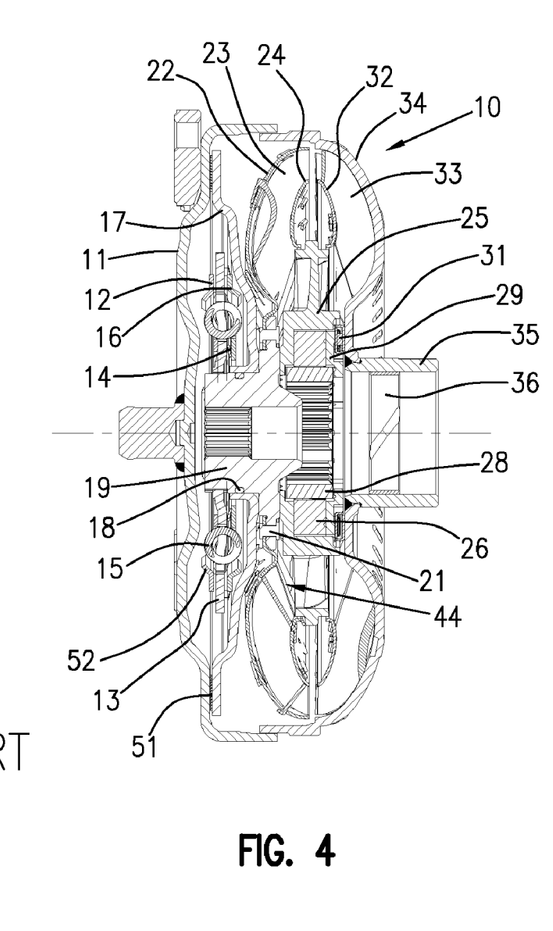
FIG. 4 is a cross-sectional view of the torque converter shown in FIGS. 2 and 3, taken generally along line 4-4 in FIG. 3.
Figure 5:
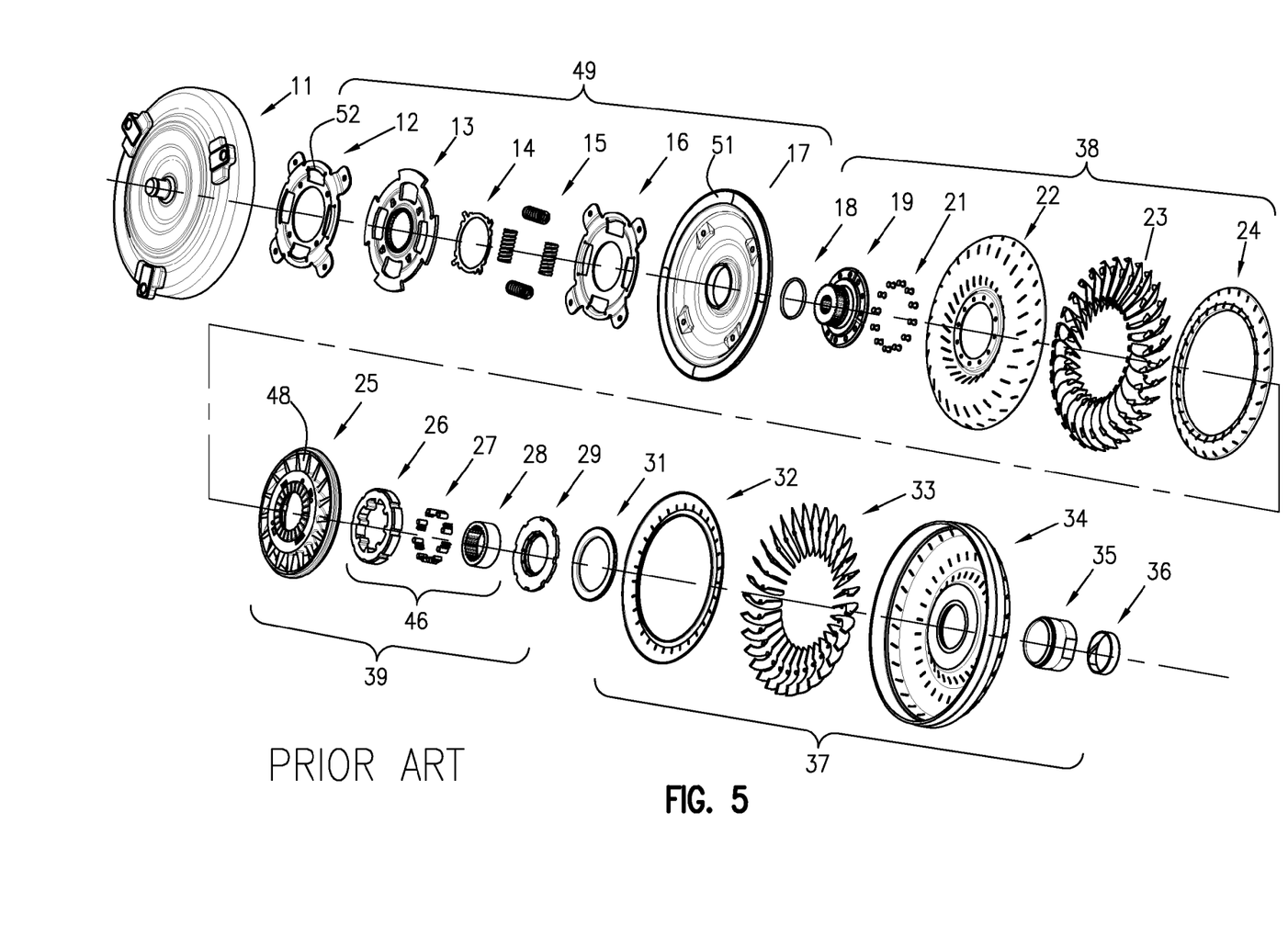
FIG. 5 is a first exploded view of the torque converter shown in FIG. 2, as shown from the perspective of one viewing the exploded torque converter from the left.
Figure 6:
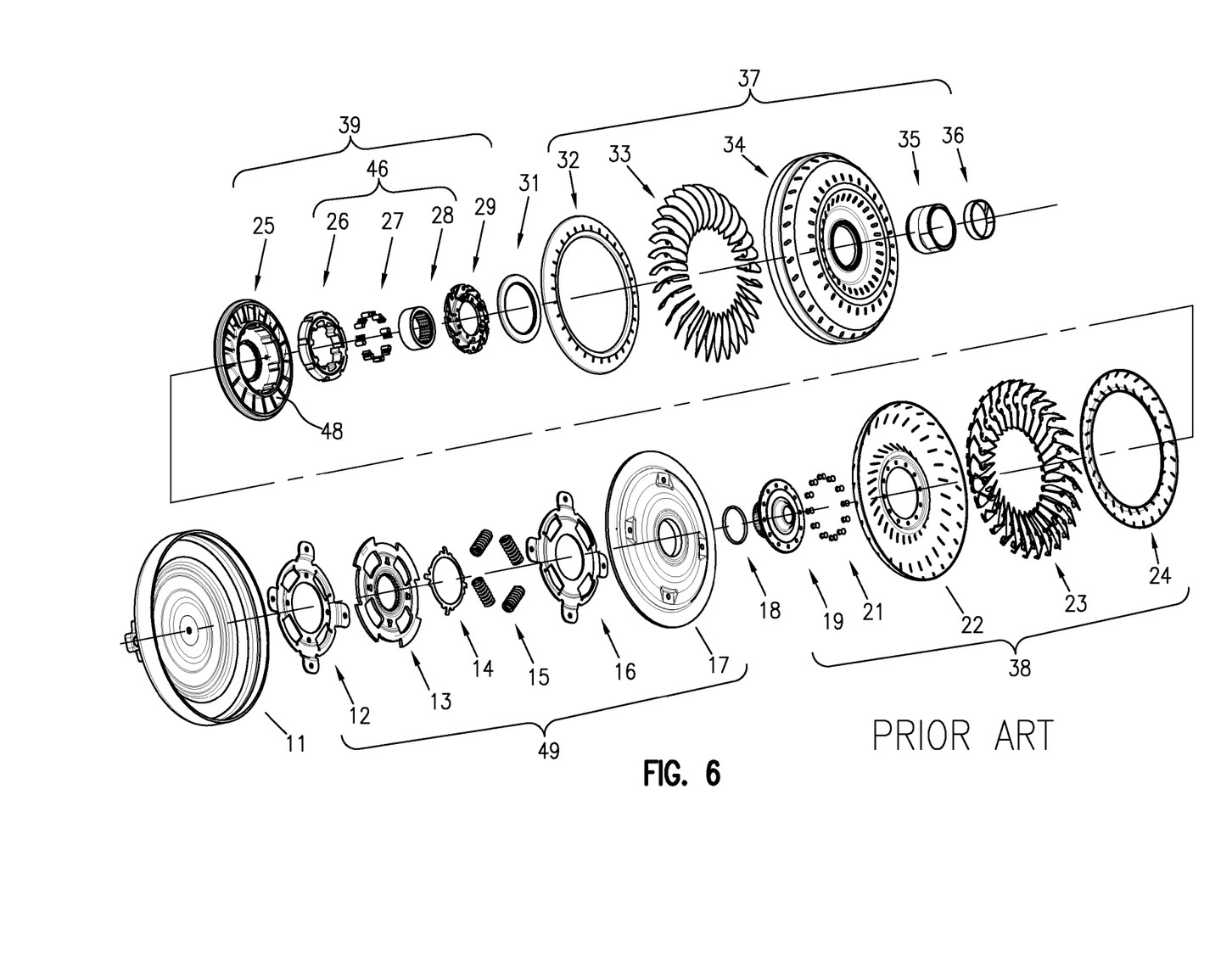
FIG. 6 is a second exploded view of the torque converter shown in FIG. 2, as shown from the perspective of one viewing the exploded torque converter from the right.
Figure 13:
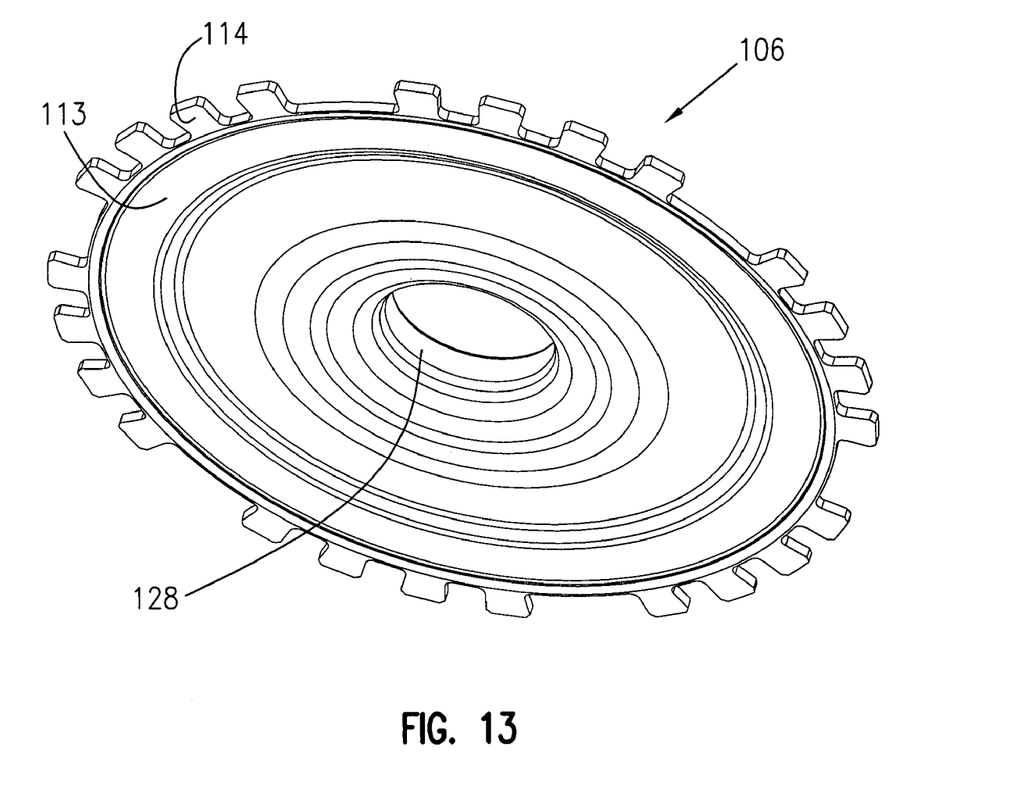
FIG. 13 is a front perspective view of the piston plate of the present invention; and, FIG. 14 is a top view of the piston plate of the present invention.
Figure 14:
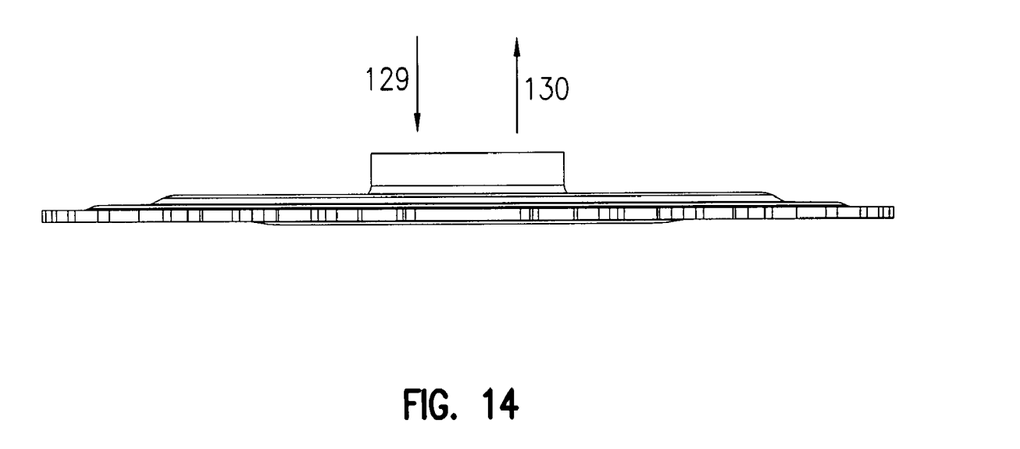

FIG. 13 is a front perspective view of a present invention piston plate. FIG. 14 is a top view of the piston plate shown in FIG. 13. The following should be viewed in light of FIGS. 11 through 14. Piston plate 106 comprises friction face portion 113, sealing bore 128, and tab portion 114. Sealing bore 128 is arranged to compress turbine hub seal (not shown, for instance item 18 in FIG. 4) and friction material ring 108, to create a pressure chamber. During engagement, piston plate bore moves in direction 129 relative to a turbine hub seal (not shown). During disengagement, piston plate bore moves in direction 130 relative to the turbine hub seal (not shown). In other words, the turbine hub seal (not shown) slides in piston plate bore 128.

Tabs 114 extend from piston plate 106 to engage drive plate tabs 103 and 126. When pressurized, the portion of torque carried by piston plate 106 due to frictional engagement with friction material ring 108 is transmitted to drive plate 101 through piston plate tabs 114.

Axially extending drive plate tabs 103 and 126 transmit torque and permit axial movement of piston plate 106 relative to drive plate relative to piston plate and elastic members. Axial portion of spring engagement tabs remain engaged with elastic members by sliding axially during engagement and disengagement of the clutch. Furthermore, the piston plate is free to move axially during engagement and disengagement as a result of hydraulic pressure though torque is still transmitted between piston plate drive tab portions and drive plate tab portions.

Returning to FIG. 7, damper elastic members 116 may include endcaps 120 to increase contact area between drive plate tabs 103 and elastic members 116. Endcaps 120 increase contact area by providing a continuous surface for tabs 103 to contact. Otherwise elastic members may be limited by the diameter 121 of spring wire. Wear is reduced by increasing contact area between mating components, thereby reducing unit pressure.

In some aspects, drive plate 101 is hardened by a heat treating process. For instance, drive plate 101 may be case hardened or nitrided to increase surface hardness, thereby reducing wear. Hardening of drive plate 101 also improves durability by increasing resistance to fatigue cracking.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. In a hydrokinetic torque converter that includes a casing, an impeller driveably connected to the casing and a turbine located between the casing and the impeller, a clutch for driveably releasing and locking the impeller and turbine, comprising:
    a turbine hub connected to said turbine;
    a piston slidably mounted on said turbine hub, sealed on said turbine hub against passage of fluid, and having a first friction surface located at a radially outer portion of the piston;
    a drive ring having second and third friction surfaces, said piston displaceable to engage the first and second friction surfaces;
    a drive plate having fourth and fifth friction surfaces, the drive ring displaceable to engage the third and fourth friction surfaces, said drive plate driveably connected to said piston and to an elastic member of a damper, such that the drive plate and the piston rotate together when the third and fourth surfaces are not engaged and such that torque from the drive plate is transferred to the elastic member; and,
    a sixth friction surface for the casing, the drive plate displaceable to engage the fifth and sixth friction surfaces, wherein the drive ring and the casing are nonreleasably connected and wherein the drive ring is axially displaceable with respect to the casing.

2. The clutch of claim 1 wherein said elastic member comprises a compression spring.

3. The clutch of claim 2 wherein said compression spring has an arcuate form.

4. The clutch of claim 1 wherein said drive ring is hardened by one of the group of processes consisting of case hardening, nitrocarburizing, and nitriding.

5. A clutch assembly for a torque converter comprising:
    a piston plate including a plurality of drive tabs extending radially outwardly from an outer periphery of the piston plate; and,
    a drive plate comprising:
        an annular surface for frictional engagement with a cover for the torque converter;
        a first tab interlocked with the plurality of drive tabs; and,
        a second tab interlocked with an elastic member of a damper for the torque converter.

6. The clutch assembly of claim 5 wherein the first and second tabs include pluralities of first and second tabs, respectively, and the number of first tabs is greater then the number of second tabs.

7. The clutch assembly of claim 5 wherein the first and second tab are the same.

8. The clutch assembly of claim 5 wherein the second tab extends axially further from the annular surface than the first tab.

9. The clutch assembly of claim 5 wherein a width of the first tab is greater than a width of the second tab.

10. The clutch assembly of claim 5 further comprising a drive ring axially disposed between the drive plate and the piston plate and engaged with the cover through an axially flexible connection such that the drive ring and the cover rotate together.

11. The clutch assembly of claim 5 wherein the drive plate is hardened by one of the group of processes consisting of case hardening, nitrocarburizing, and nitriding.

12. A clutch and damper assembly for a torque converter comprising:
    a damper assembly comprising at least one elastic member;
    a piston plate comprising a plurality of drive tabs extending radially outwardly from an outer periphery of the piston plate; and,
    a drive plate comprising:
        an annular surface for frictional engagement with a cover for the torque converter;
        a first tab interlocked with the plurality of drive tabs; and,
        a second tab interlocked with an elastic member from the at least one elastic member.

13. The clutch and damper assembly of claim 12 wherein the at least one elastic member comprises a plurality of compression springs.

14. The clutch and damper assembly of claim 13 wherein at least one of the compression springs has an arcuate form.

15. The clutch and damper assembly of claim 12 wherein the drive plate is hardened by one of the group of processes consisting of case hardening, nitrocarburizing, and nitriding.

* * * * *